(12) United States Patent
D'Souza et al.

(10) Patent No.: US 11,797,095 B2
(45) Date of Patent: Oct. 24, 2023

(54) HAPTICS WAVEFORM GENERATOR

(71) Applicant: QUALCOMM Incorporated, San Diego, CA (US)

(72) Inventors: Sandeep Louis D'Souza, San Diego, CA (US); Hui-Ya Liao Nelson, San Diego, CA (US); Eddie Choy, Carlsbad, CA (US); Louis Dominic Oliveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/650,902

(22) Filed: Feb. 14, 2022

(65) Prior Publication Data

US 2023/0259209 A1    Aug. 17, 2023

(51) Int. Cl.
*H04B 3/36* (2006.01)
*G06F 3/01* (2006.01)
*H02N 2/06* (2006.01)

(52) U.S. Cl.
CPC ............ *G06F 3/016* (2013.01); *H02N 2/06* (2013.01)

(58) Field of Classification Search
CPC .. G06F 3/016; H02N 2/06; G08B 6/00; G08B 1/045
See application file for complete search history.

(56) References Cited

U.S. PATENT DOCUMENTS

| | | | |
|---|---|---|---|
| 2014/0218185 A1* | 8/2014 | Cruz-Hernandez | G08B 6/00 340/407.1 |
| 2020/0342724 A1* | 10/2020 | Marchais | G06F 3/016 |
| 2021/0125469 A1* | 4/2021 | Alderson | B06B 1/045 |
| 2021/0135616 A1 | 5/2021 | Hernandez et al. | |
| 2021/0223865 A1* | 7/2021 | Nguyen | G06F 3/017 |
| 2021/0325967 A1 | 10/2021 | Khenkin et al. | |

OTHER PUBLICATIONS

International Search Report and Written Opinion—PCT/US2022/082415—ISA/EPO—dated Apr. 26, 2023.

* cited by examiner

*Primary Examiner* — Toan N Pham
(74) *Attorney, Agent, or Firm* — QUALCOMM Incorporated

(57) ABSTRACT

Innovative techniques to design and generate haptics waveforms are proposed. The proposed techniques enable consistent haptics user-experience to be enable despite variations among different haptic actuators. Arbitrary waveforms may be generated without selecting from a list of predetermined waveforms.

30 Claims, 9 Drawing Sheets

HAPTICS WAVEFORM GENERATOR

FIELD OF DISCLOSURE

This disclosure relates generally to generating haptics waveforms, e.g., required to drive haptic actuators such as linear resonant actuators (LRA).

BACKGROUND

Haptic (vibration pattern) experience on platforms—e.g., mobile devices such as smart phones—is being enhanced day by day. In a perspective, haptics may be viewed as stimulation of the senses of touch and motion, e.g., by reproducing sensations when interacting with physical objects.

When providing haptic feedback, large sets of different mechanical vibrations may be utilized. For example, a virtual home button may be a short, sharp click, whereas a thunder may be a slow rumbling vibration. When generating the prescribed mechanical vibration for haptics, electrical waveforms are applied to the haptic actuator.

A good user experience should provide consistent haptic vibration across different actuators and user devices. Unfortunately, due to variations among actuators, the same electrical waveform may not generate same vibration on different actuators. This can be true even among different actuator parts made by the same manufacturer. Moreover, even different units of the same actuator part may produce different haptic vibration when stimulated by the same electrical waveform because of part-to-part variations in the manufactured part. Also, even with a same actuator part, the same waveform may result in different vibration at different times, e.g., due to environmental differences (e.g., different thermal, mechanical and/or electrical environment) and/or aging of the actuator of the mobile device.

Accordingly, there is a need for systems, apparatus, and methods that overcome the deficiencies of conventional haptics waveform design/generation including the methods, system and apparatus provided herein.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

An exemplary device configured to generate haptic waveform is disclosed. The device may comprise an envelope composer configured to compose, upon an occurrence of a haptic trigger event, an envelope of an acceleration profile based on the haptic trigger event. The device may also comprise a mixer configured to generate an acceleration waveform corresponding to the envelope. The acceleration waveform may be generated at a resonant frequency of a haptic actuator received from a tone generator. The device may further comprise a smart haptic driver configured to drive the haptic actuator with a driving signal in accordance with the acceleration waveform. The smart haptic driver may also be configured to conduct one or more feedback measurements on the haptic actuator upon the haptic actuator being driven with the driving signal. The device may yet comprise a tracker configured to determine one or more parameters of the haptic actuator based on the one or more feedback measurements. The one or more parameters may include the resonant frequency of the haptic actuator. The mixer may be configured to generate the acceleration waveform at the resonant frequency of the haptic actuator as determined based on the one or more feedback measurements.

A method of generating haptic waveform is disclosed. The method may comprise composing, upon an occurrence of a haptic trigger event, an envelope of an acceleration profile based on the haptic trigger event. The method may also comprise generating an acceleration waveform corresponding to the envelope. The acceleration waveform may be generated at a resonant frequency of a haptic actuator. The method may further comprise driving the haptic actuator with a driving signal in accordance with the acceleration waveform. The method may yet comprise conducting one or more feedback measurements on the haptic actuator upon the haptic actuator being driven with the driving signal. The method may yet further comprise determining one or more parameters of the haptic actuator based on the one or more feedback measurements. The one or more parameters may include the resonant frequency of the haptic actuator. The acceleration waveform may be generated at the resonant frequency of the haptic actuator as determined based on the one or more feedback measurements.

An exemplary device configured to generate haptic waveform is disclosed. The device may comprise means for composing, upon an occurrence of a haptic trigger event, an envelope of an acceleration profile based on the haptic trigger event. The device may also comprise means for generating an acceleration waveform corresponding to the envelope. The acceleration waveform may be generated at a resonant frequency of a haptic actuator. The device may further comprise means for driving the haptic actuator with a driving signal in accordance with the acceleration waveform. The device may yet comprise means for conducting one or more feedback measurements on the haptic actuator upon the haptic actuator being driven with the driving signal. The device may yet further comprise means for determining one or more parameters of the haptic actuator based on the one or more feedback measurements. The one or more parameters may include the resonant frequency of the haptic actuator. The acceleration waveform may be generated at the resonant frequency of the haptic actuator as determined based on the one or more feedback measurements.

A non-transitory computer-readable medium storing computer-executable instructions for a device configured to generate haptic waveform is disclosed. The computer-executable instructions may comprise one or more instructions instructing the device to compose, upon an occurrence of a haptic trigger event, an envelope of an acceleration profile based on the haptic trigger event. The computer-executable instructions may also comprise one or more instructions instructing the device to generate an acceleration waveform corresponding to the envelope. The acceleration waveform may be generated at a resonant frequency of a haptic actuator. The computer-executable instructions may further comprise one or more instructions instructing the device to drive the haptic actuator with a driving signal in accordance with the acceleration waveform. The computer-executable instructions may yet comprise one or more instructions instructing the device to conduct one or more feedback measurements on the haptic actuator upon the haptic actuator being driven with the driving signal. The computer-executable instructions may yet further comprise one or more instructions instructing the device to determine one or more parameters of the haptic actuator based on the one or more feedback measurements. The one or more parameters may include the resonant frequency of the haptic actuator. The acceleration waveform may be generated at the resonant frequency of the haptic actuator as determined based on the one or more feedback measurements.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure.

Figure 1:
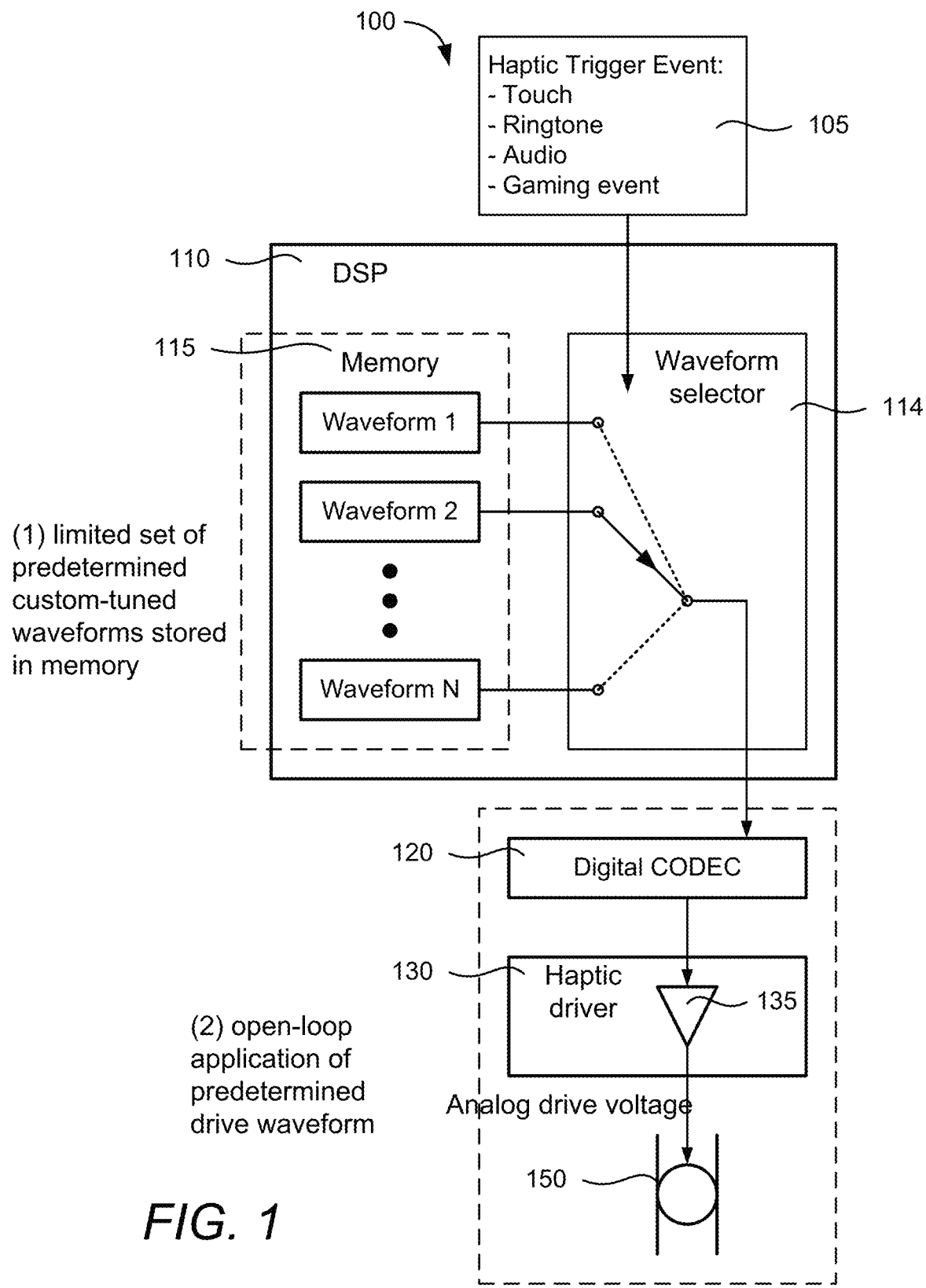
FIG. 1 illustrates a conventional haptic waveform generation system.

Other objects and advantages associated with the aspects disclosed herein will be apparent to those skilled in the art based on the accompanying drawings and detailed description. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Aspects of the present disclosure are illustrated in the following description and related drawings directed to specific embodiments. Alternate aspects or embodiments may be devised without departing from the scope of the teachings herein. Additionally, well-known elements of the illustrative embodiments herein may not be described in detail or may be omitted so as not to obscure the relevant details of the teachings in the present disclosure.

In certain described example implementations, instances are identified where various component structures and portions of operations can be taken from known, conventional techniques, and then arranged in accordance with one or more exemplary embodiments. In such instances, internal details of the known, conventional component structures and/or portions of operations may be omitted to help avoid potential obfuscation of the concepts illustrated in the illustrative embodiments disclosed herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Haptic feedback generations may be used in mobile phones, wearables, virtual reality, gaming, internet of things (IoT), etc. Some haptic feedback use cases include cold start boot-up (e.g., to power up the phone), touch-to-wake (e.g., wake up from sleep mode), virtual home button, touch haptic feedback (e.g., scroll wheel), application alerts, and so on. Some of the more advanced haptic feedback use cases include audio synchronized haptic (e.g., haptic waveform synchronized to audio playback), gaming haptics, etc.

As indicated above, large sets of different mechanical vibrations may be rendered to provide haptic feedback. For example, a virtual home button may be a short, sharp click, whereas a thunder may be a slow rumbling vibration. When generating the prescribed mechanical vibration for haptics, electrical waveforms are applied to the haptic actuator. However, electrical waveforms applied to the haptics applied to the haptic actuator such as the LRA to generate the prescribed mechanical vibration needs to be designed based on many factors. These may include electromechanical parameters of the LRA, mobile device mechanical design, phone battery voltage and current limits, and so on. The factors may also include user grip (e.g., single hand, two hand, device on table, etc.), user hand physiology (e.g., fleshy vs. bony fingers and palms), user perception, etc. Unfortunately, LRA parameters, device mechanical design, and user physiology are subject to variation from device-to-device, part-to-part, time, temperature, user population and behavior.

A good user experience should provide consistent haptic vibration across different actuators and user devices. Unfortunately, due to variations among actuators, the same electrical waveform may not generate same vibration on different actuators. This can be true even among different actuators parts made by the same manufacturer. Moreover, even different units of the same actuator part may produce different haptic vibration when stimulated by the same electrical waveform because of part-to-part variations in the manufactured part. Also, even with a same actuator part, the same waveform may result in different vibration at different times, e.g., due to environmental differences (e.g., different thermal, mechanical and/or electrical environment) and/or aging of the actuator of the mobile device.

The problem of generating haptic waveforms can be quite severe. The large and ever-increasing applications can demand larger number and more complex vibrations. Also, emerging audio synchronous haptics and interactive gaming may require the waveforms to be designed during runtime. In addition, users can be sensitive to even subtle inaccuracies or artifacts in haptics vibration.

To address some or all issues associated with conventional haptics waveform design and/or generation including some or all issues indicated above, it is proposed to design and/or generate haptics waveforms that maintain consistent haptics vibrations across various LRAs (more generally, across various haptic actuators), mobile devices and use cases without tuning and excessive memory requirements.

The proposed technique to design/generate haptics waveform may be generally described as follows. The electrical waveform required to drive the haptic actuator may be generated. The waveform may be calculated or otherwise determined based on an envelope of the necessary acceleration, a basis function (e.g., a sinusoidal tone at LRA resonant frequency), LRA and driving amplifier supply voltage, electrical current and thermal constraints and LRA electromechanical parameters, etc. In an aspect, LRA parameters may be determined based on off-line measurements, real-time tracking, and vendor specifications.

The proposed technique supports generation of arbitrary waveforms that may be produced consistently across different LRAs, mobile devices and use-cases without custom tuning. In doing so, good haptics user experience may be had, custom-tuned waveforms may be eliminated, consistency across multiple devices may be achieved, repeatability in mass production may be provided, and future proofing may be achieved against new applications and games released after a device launch.

FIG. 1 illustrates a system 100 for conventional haptic waveform generation. Upon an occurrence of a haptic trigger event 105 (e.g., touch, ringtone, audio, gaming event, etc.), a waveform selector 114 of a digital signal processor (DSP) 110 selects a waveform n (n=1 . . . N) from among a plurality predetermined (or pre-canned) waveforms stored in memory 115. In FIG. 1, selection of waveform 2 is highlighted. A haptic trigger event may include events such as a user touching a touch screen of a mobile device, an incoming call ringtone, an audio playback to which the haptics is synchronized, or a gaming event.

The selected waveform is sent to a signal processing, amplification and actuation chain that includes a digital coder-decoder (CODEC) 120, a haptic driver 130, and an LRA 150. The digital CODEC 120 processes the selected waveform n and outputs a corresponding waveform signal to the haptic driver 130. The amplifier 135 of the haptic driver 130 in turn outputs an analog voltage signal to drive the LRA 150.

Note that in the conventional waveform generation, the waveform is selected from a limited number of predetermined waveforms. This means that to generate a variety of waveforms, the number of predetermined waveforms needs to be large (i.e., N needs to be large), which in turn requires large memory usage. Also, an open-loop application of a predetermined waveform is utilized to drive the LRA. Thus, there is no feedback to ascertain whether the LRA is driven correctly.

In some conventional haptic waveform generation methods, the waveform may be linear combination, such as a sum, difference or scaling, of the limited number of predetermined waveforms instead of a selection. This however, still has limitations of there being no closed-loop feedback to ascertain whether the LRA is driven correctly.

Moreover, as the time-domain and frequency spectrum domain characteristics of the pre-determined waveforms are fixed in regards to, e.g., their frequency, rise and fall-time, amplitude, such a combination still has the limitations of not applying consistent vibrations across different LRAs and over aging and operating conditions as explained above.

Figure 2A:
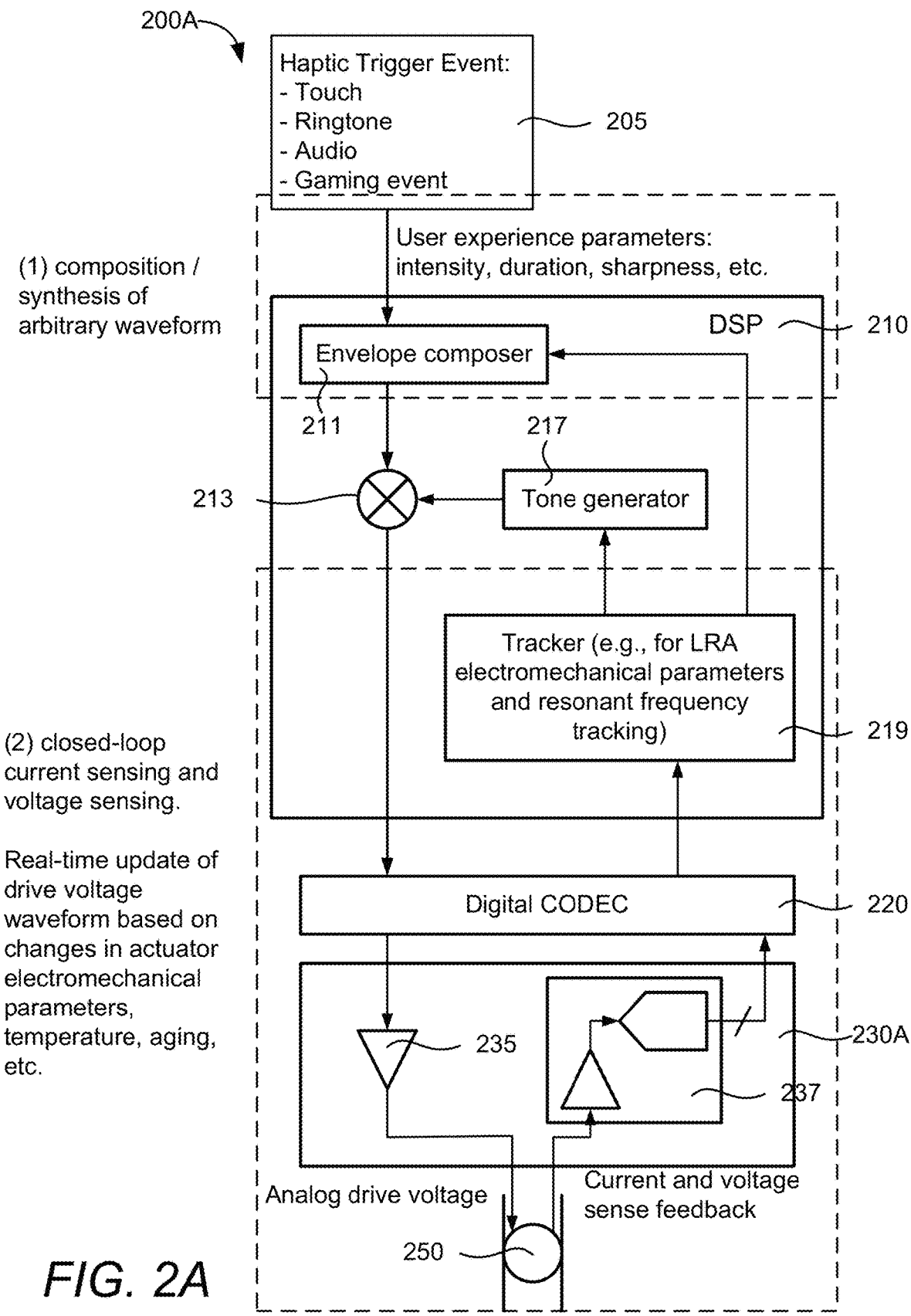
FIGS. 2A and 2B illustrate haptic waveform generation devices or systems in accordance with one or more aspects of the disclosure.

FIG. 2A illustrates an example system 200A to generate haptic waveforms in accordance with one or more aspects of the disclosure. Unlike the conventional system, the example system 200A provides a closed-loop feedback regarding the conditions of the haptic actuator 250 (e.g., electromechanical parameters, temperature, aging, etc.). In this way, the driving signal that drives the haptic actuator 250 may be updated in real time based on the actual state and/or condition of the haptic actuator 250. An example of the haptic actuator 250 is LRA. For the discussion, LRA will be assumed to be the haptic actuator, keeping in mind that the discussion may be applicable to other types of haptic actuators (e.g., eccentric rotating mass (ERM), piezoelectric bender, etc.).

In this example system, an envelope composer 211 may be configured to design, synthesize, generate or otherwise compose an envelope of a waveform upon an occurrence of a haptic trigger event (e.g., touch, ringtone, audio, gaming event, etc.). The envelope composer 211 may compose the envelope also based on one or more user-experience parameters (e.g., intensity, duration, sharpness, etc.). The user-experience parameters may be designed or otherwise specified by a user, e.g., such that the haptic vibrations may be generated according to the preferences of the user. Note that there may be some user-experience parameters not specifically defined by the user. For these, default parameter values may be used. In general, the envelope composer 211 may be configured to compose an envelope of any arbitrary waveform. As mentioned, user-experience parameters may be considered when composing the envelope.

While the envelope composer 211 is shown as being a part of the DSP 210, this is not a requirement. The envelope composer 211 may reside in an application processor (e.g., as hardware or a combination of hardware and software). In an aspect, the envelope composer 211 may be configured to compose an envelope of a desired acceleration profile. For example, the envelope composer 211 may determine acceleration necessary for the haptic actuator 250 to achieve the desired acceleration based on the haptic trigger event 205. The envelope composer 211 may output an envelope signal indicative of the composed acceleration profile.

A mixer 213 may receive the envelope signal from the envelope composer 211 and a basis function—e.g., sinusoidal tone—from a tone generator 217 (described further below) and mix the envelope with the basis function and output a waveform. In this instance, the mixing performed by the mixer 213 may be a multiplicative mixing of signals such as radio frequency (RF) signals. The mixer 213 may use the envelope indicated by the envelope signal to modulate the tone from the tone generator 217. In an aspect, the waveform output by the mixer 213 may also be referred to as an acceleration waveform since it is associated with the acceleration profile.

A key input to the tone generator 217 is frequency. Typically, haptic actuators such as the LRA 250 are narrow band systems. Thus, ensuring that the frequency of the tone output by the tone generator 217 line up with the resonant frequency of the LRA 250 significant in regards to the performance of the system. The tone generator 217 may receive the frequency from a tracker 219 configured to track the resonant frequency of the LRA 250.

Alternatively or in addition thereto, the tracker 219 may be configured to calculate, infer or otherwise determine the electromechanical parameters (e.g., spring stiffness (k), mass (m), mechanical damping factor (b), electromechanical coupling factor (BL), etc.) of the LRA 250. In other words, the LRA 250 may be modeled. The LRA modeling may be performed in real-time or in near real-time. In this way, the tracker 219 may continuously monitor, and thus be able adapt to changes that occur within the LRA 250 (e.g., due to aging, temperature fluctuations, etc.).

In contrast with the conventional system 100 illustrated in FIG. 1, the system 200A illustrated in FIG. 2A is a closed-loop feedback system. The acceleration waveform from the mixer 213 may be supplied to a digital CODEC 220, which may process (e.g., interpolate, filter, etc.) the acceleration waveform from the mixer 213 and output a corresponding waveform signal to a smart haptic driver 230A. An amplifier 235 (which may be comprised in the smart haptic driver 230A) may in turn output a driving signal (e.g., an analog voltage signal) to drive the LRA 250.

Simultaneously, or at least contemporaneously with driving of the LRA 250, a feedback sensor 237 (which may also be comprised in the smart haptic driver 230A) may measure or otherwise sense the voltage across the LRA 250 and/or current going through the LRA 250. In particular, the feedback sensor 237 may sense the voltage/current in a coil of the LRA 250. The sensed voltage/current (V/I) may be digitized and provided as feedback measurements to the digital CODEC 220, and eventually to the tracker 219 to so that the LRA 250 may be modeled (e.g., determine LRA resonant frequency, LRA electromechanical parameters, etc.).

From the modeling, the tracker 219 may be configured to supply the tone generator 217 with the LRA resonant frequency. As a result, the tone generator 217 may output the tone with proper frequency to the mixer 213. Also from the modeling, the tracker 219 may be configured to supply the envelope composer 211 with the LRA electromechanical parameters. The envelope composer 211 may adjust the envelope in consideration of the LRA electromechanical parameters.

The closed-loop feedback system enables updating and tuning of the waveform based on real-time changes in the electromechanical parameters of the LRA, e.g., due to aging and/or environmental factors such as temperature (e.g., within the LRA, from the phone, etc.). For example, LRA's spring stiffness k may decrease, e.g., become more malleable, over time and/or when the temperature increases. This may result in the resonant frequency being reduced. As another example, LRA's electromechanical coupling factor BL may be different at different times, again due to environmental variations, resulting in the resonant frequency being different. The adaptation enabled by the closed-loop system implies that same or similar haptic vibrations may be generated from a same haptic trigger event despite the variations. That is, consistency in the user haptic experience may be achieved across variations in the mechanical properties of the haptic actuators. Also significantly, the waveform may be generated without having to resort to a list of predetermined waveforms. As a result, substantial amount of memory may be saved. Also, a waveform tailored to an arbitrary haptic trigger event may be generated instead of finding a "closest fit" among a list of predetermined waveforms.

Figure 2B:
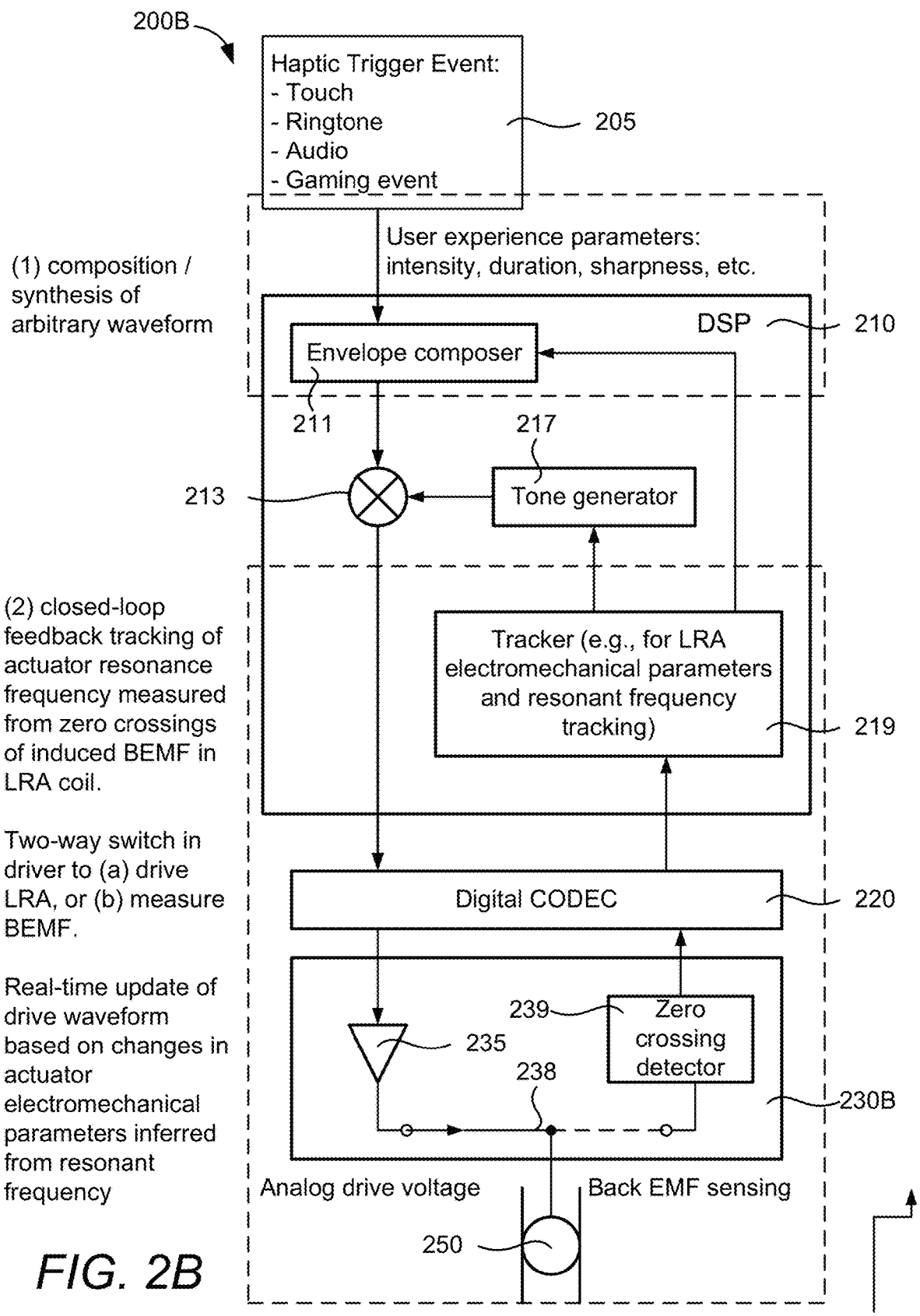

FIG. 2B illustrates another example system 200B to generate haptic waveforms in accordance with one or more aspects of the disclosure. Like FIG. 2A, the system 200B is also a closed-loop feedback system that tracks the resonant frequency and/or the electromechanical parameters of the LRA 250 in real-time or in near-real-time. That is, user-experience consistency across variations in the LRA may also be achieved with the system 200B.

The flow of system 200B in FIG. 2B differs from the flow of system 200A of FIG. 2A in the way the feedback is provided to the tracker 219. In particular, a back electromotive force (BEMF) of the LRA 250 may be measured or otherwise sensed to determine the LRA's resonant frequency, electromechanical parameters, etc. The sensed BEMF may be the EMF induced by the movement of the LRA's vibrating mass (e.g., a conductor moving through a magnetic field).

The smart haptic driver 230B may include the amplifier 235 (similar to the smart haptic driver 230A) configured to output the driving signal to drive the LRA 250 based on the acceleration waveform from the mixer 213 (e.g., processed through the digital CODEC 220).

But unlike the smart haptic driver 230A, the smart haptic driver 230B may include a switch 238 and a zero crossing detector 239. The switch 238, which may be a two-way switch, may be configured to couple the output of the amplifier 235 to the LRA 250 when the LRA 250 is to be driven. When the BEMF is to be sensed, the switch 238 may be configured to couple the LRA 250 with the input of the zero crossing detector 239. As the name implies, the zero crossing detector 239 may be configured to detect the zero crossings of the BEMF, which may be provided as feedback to the digital CODEC 220 and to the tracker 219. Other information such as waveform ringdown, envelope decay, etc. may also be detected and included in the feedback.

As before, the tracker 219 may be configured to model the LRA based on the feedback received from the smart haptic driver 230B, and to provide the modeling information to the envelope composer 211 and/or to the mixer 213. In modeling the LRA 250, the tracker 219 may track or otherwise determine the resonant frequency of the LRA 250 based on timings of the zero crossings detected by the zero crossing detector 239. The tracker 219 may also infer, calculate or otherwise determine the electromechanical parameters of the LRA 250 based on the actual waveform characteristics such as the waveform ringdown, envelope decay, etc., which may also be provided from the zero crossing detector 239.

The following lists some (not necessarily all) technical features of the proposed technique:
Prior knowledge of LRA resonant frequency is not required.
Continuously drive voltage across LRA and simultaneously or contemporaneously measure both voltage and current in LRA coil (e.g., see FIG. 2A);
Model LRA and determine LRA parameters:
Spring stiffness (k) (e.g., in newtons per meter (N/m));
Mass of LRA (m) (e.g., in grams (g));
Mechanical damping factor (b) (e.g., in newton-seconds per meter (N-s/m));
Electromechanical coupling factor (BL)—from electrical-to-mechanical or mechanical-to-electrical domains:
Electrical-to-mechanical coupling—amount of mechanical force exerted on moving mass of LRA due to current (e.g., in newtons per ampere (N/A));
Mechanical-to-electrical coupling—back EMF induced by the moving mass of the LRA (e.g., in volt-seconds per meter (V-s/m));

Accelerometer sensor external to the mobile device not necessary. The voltage waveform to produce the desired vibration acceleration is designed.

Figure 3:
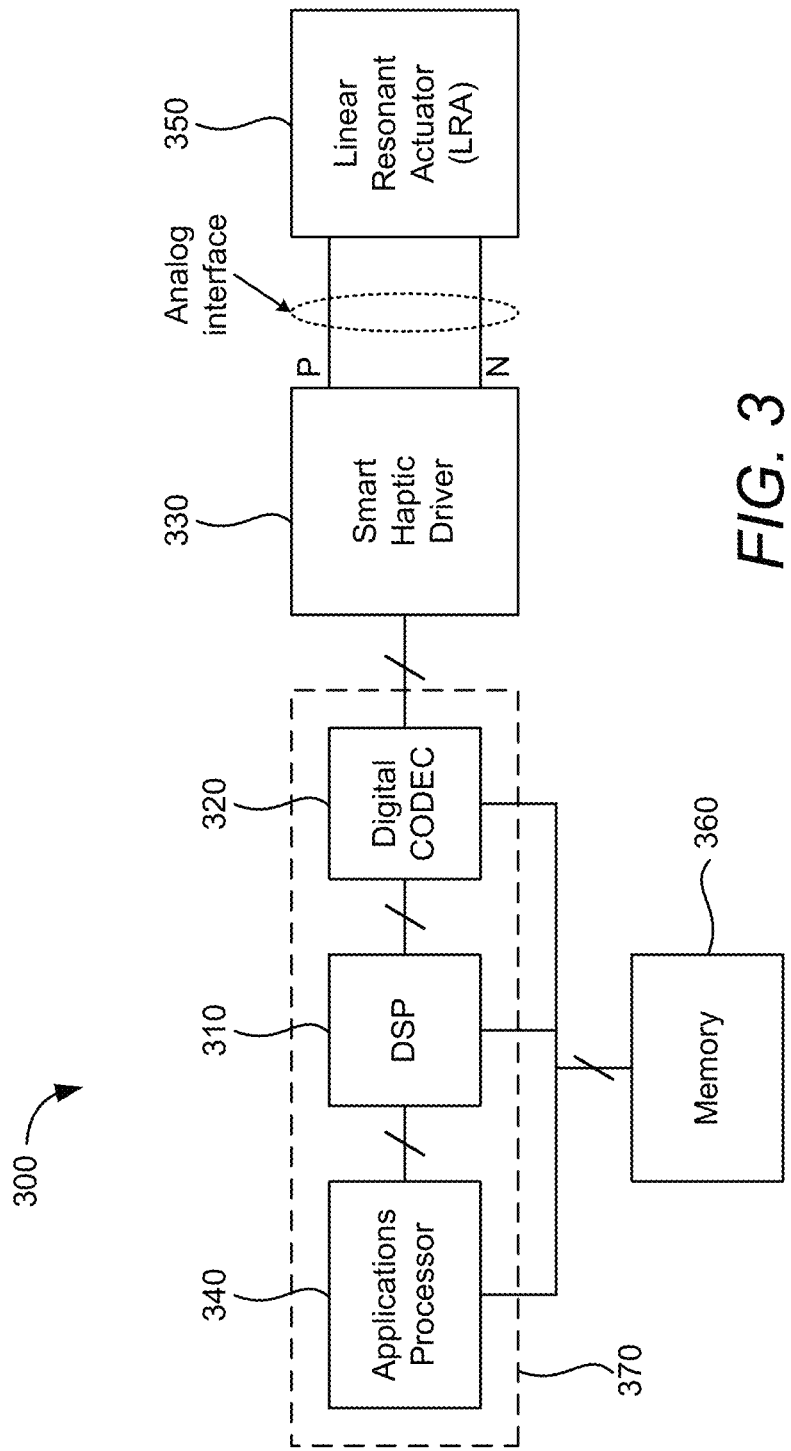
FIG. 3 illustrates an example architecture of a device or system configured to generate haptic waveform in accordance with at one or more aspects of the disclosure.

FIG. 3 illustrates an example architecture of a device 300 configured to generate haptic waveform in accordance with at one or more aspects of the disclosure. The device 300 may be a mobile device, such as a smart phone. As seen, the device 300 may include an applications processor 340, a DSP 310, a digital CODEC 320, a smart haptic driver 330, an LRA 350 (or more generally a haptic actuator), and memory 360. Each of the applications processor 340, the DSP 310, the digital CODEC 320, the smart haptic driver 330, and the LRA 350 may be implemented as hardware or as a combination of hardware and software (e.g., stored in memory 360).

In this instance, the LRA 350 is illustrated as a two-terminal device driven by differential analog signals outputted by the smart haptic driver 330. The smart haptic driver 330 may be connected to the digital CODEC 320, which in turn may be connected to the DSP 310 and the applications processor 340, e.g., through digital interfaces. In an aspect, the applications processor 340, the DSP 310 and/or the digital CODEC 320 may be realized in a single integrated circuit (IC) such as in an integrated mobile device processor.

While not shown, it may be assumed that the DSP 310 may be similar to the DSP 210 of FIGS. 2A and 2B. That is, the DSP 310 may comprise an envelope composer, a mixer, a tone generator, a tracker, etc., each of which may be implemented in hardware or a combination of hardware and software. It may also be assumed that the smart haptic driver 330 may be similar to the smart haptic driver 230A and/or 230B. That is, smart haptic driver 330 may comprise an amplifier, a feedback sensor, a switch, a zero crossing detector, etc., each of which may also be implemented in hardware or a combination of hardware and software.

FIG. 3 as shown illustrates one example architecture in which the applications processor 340, the DSP 310 and the digital CODEC 320 may be integrated into one integrated circuit 370. An alternative architecture may be one in which the DSP 310, the digital CODEC 320, the memory 360 (which may be an embedded memory) and the smart haptics driver are integrated into one integrated circuit, while the applications processor 340 may be separate and may interface with the memory 360.

Figure 4:
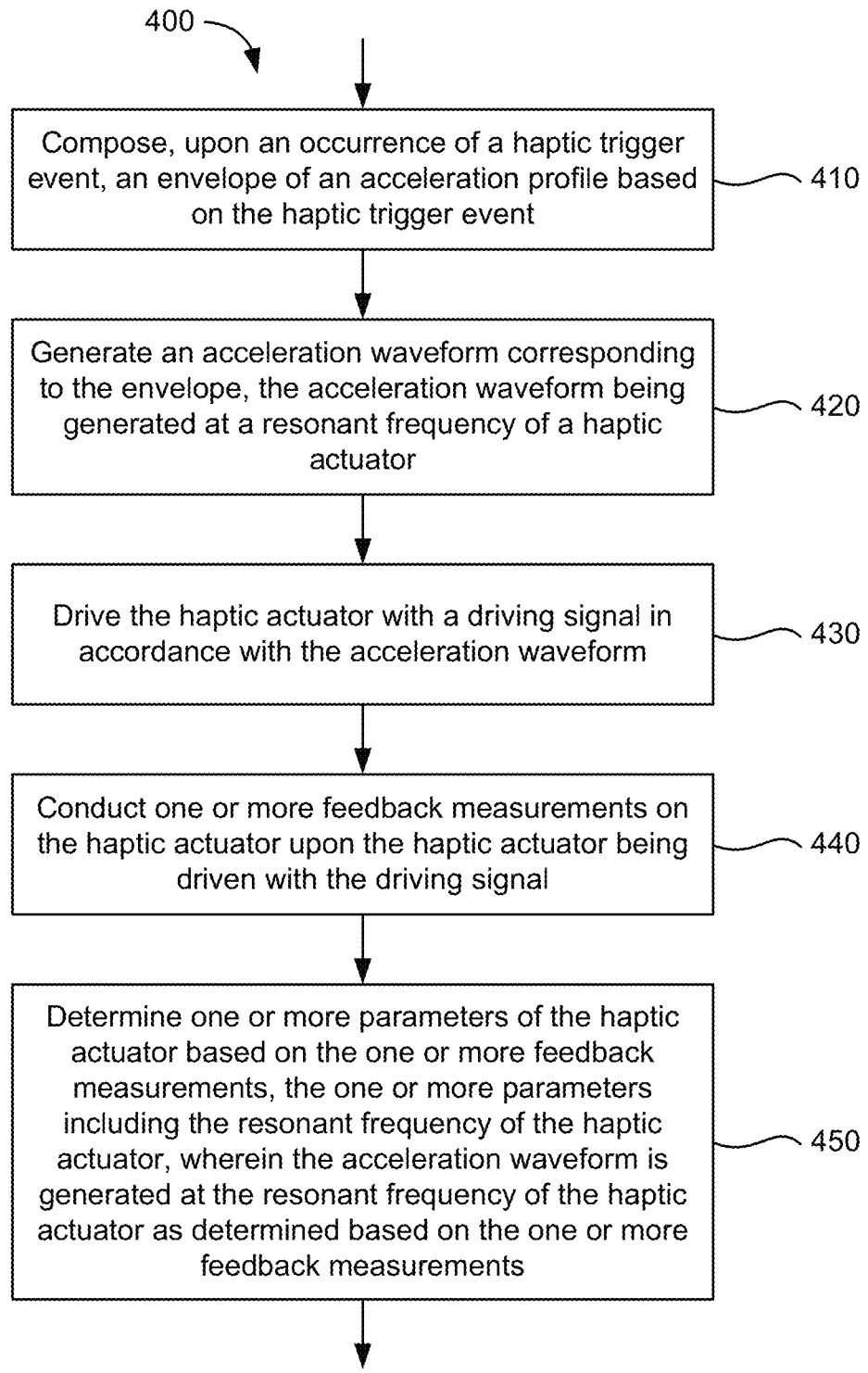
FIGS. 4, 5 and 7 illustrate flow charts of an example method of generating haptic waveform in accordance with at one or more aspects of the disclosure.

FIG. 4 illustrates a flow chart of an example method 400 of generating haptic waveform in accordance with at one or more aspects of the disclosure. The illustrated method 400 may be performed by any of the systems and/or devices 200A, 200B, 300 described above. In an aspect, the memory 360 may be an example of a non-transitory computer readable medium storing executable instructions for the system and/or device to perform the method 400 including processes to implement blocks of the method 400.

In block 410, upon an occurrence of a haptic trigger event, the device may compose an envelope of an acceleration profile based on the haptic trigger event (e.g., touch, ringtone, audio, gaming event, etc.). The acceleration profile may be a profile of an acceleration required of the haptic actuator (e.g., LRA 250, 350) to realize the haptic vibrations corresponding to the haptic trigger event. In an aspect, user-experience parameters (e.g., intensity, duration, sharpness, etc.) may also be taken into account when composing the envelope. For example, one user may prefer higher intensity, shorter duration, etc., while another user may prefer a lower intensity, longer duration, etc. for similar haptic trigger events. Alternatively or in addition thereto, haptic actuator parameters (e.g., stiffness, mass, damping factor, electromechanical coupling factor, etc.) may be considered when composing the envelope. In an aspect, a DSP (e.g., DSP 210, 310) may be an example of means for performing block 410. In particular, an envelope composer (e.g., envelope composer 211) may be configured to perform block 410.

Figure 5:
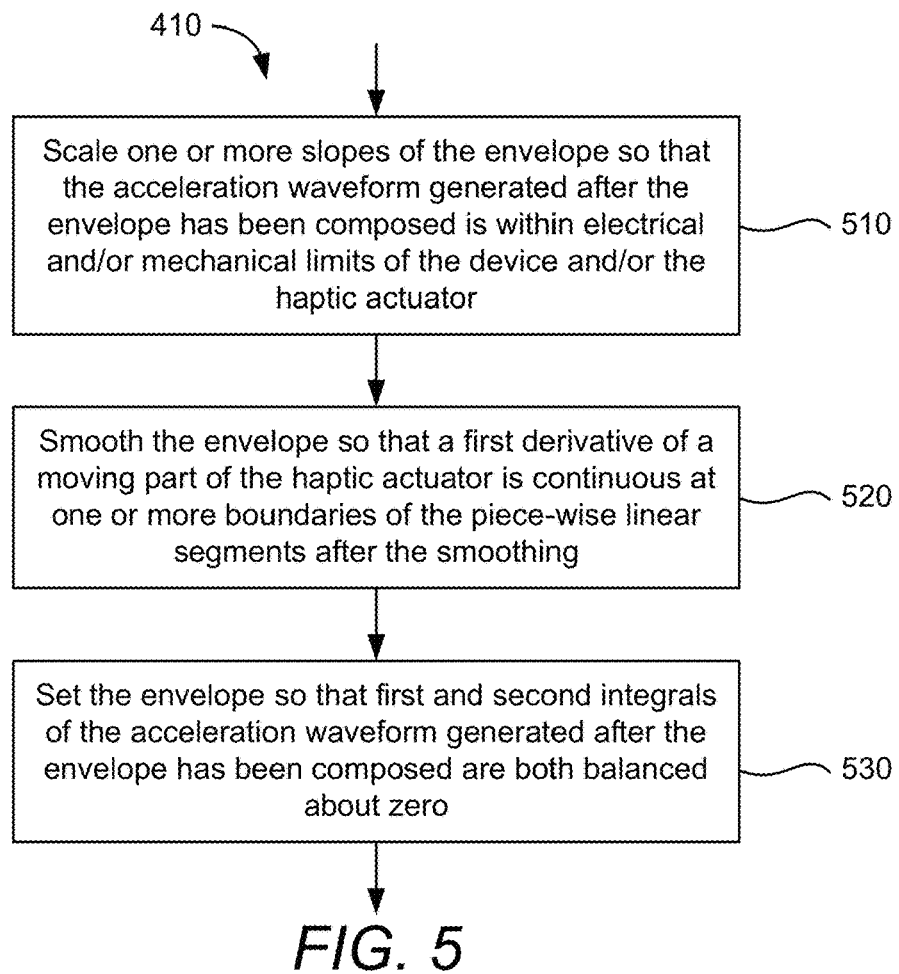

FIG. 5 illustrates a flow chart of an example process that may be performed by the device to implement block 410. In an aspect, the memory 360 may be an example of a non-transitory computer readable medium storing executable instructions for the system and/or device to perform the process of FIG. 5.

Figure 6:
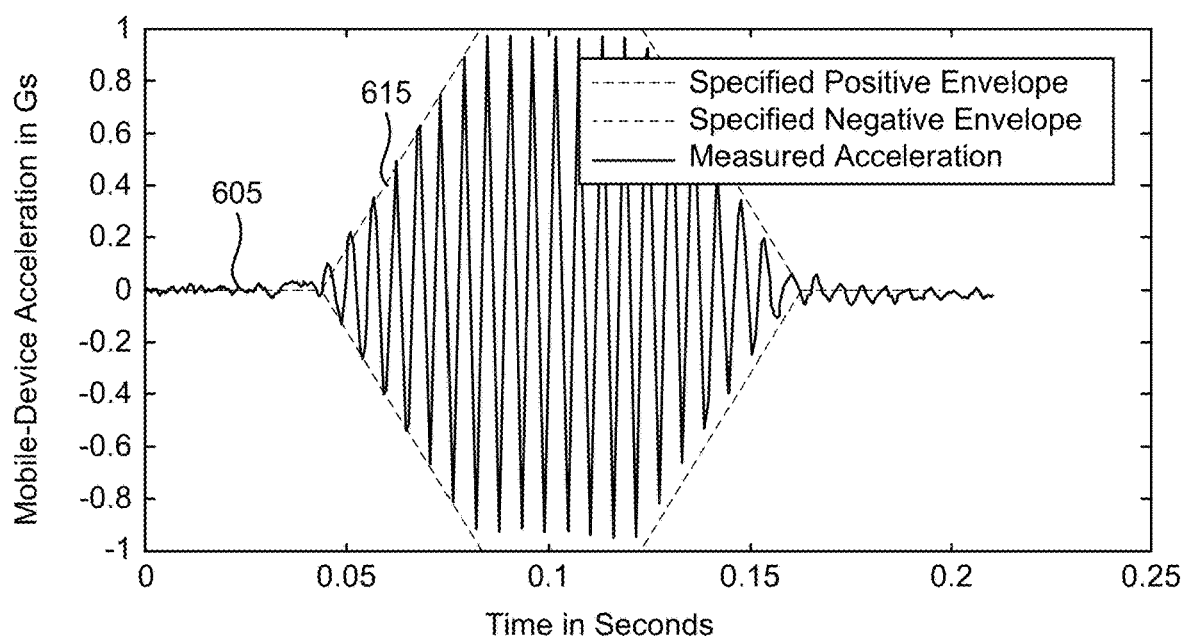
FIG. 6 illustrates an example of an envelope and corresponding haptic acceleration waveform.

In block 510, the device (e.g., DSP 210, 310, envelope composer 211) may scale one or more slopes the envelope so that the acceleration waveform generated after the envelope has been composed is within electrical and/or mechanical limits of the haptic actuator and/or the device. FIG. 6 is provided as a way of explanation. In FIG. 6, an envelope is represented graphically as a composition of piece-wise linear segments. As seen, positive and negative envelopes may be specified. For sake of simplicity, only the segments 605 and 615 are identified. However, it is seen that there are other piece-wise linear segments defining the envelope.

As mentioned above, the envelope may be used to modulate the basis function (e.g., tone from the tone generator 217). In FIG. 6, it is seen that for the most part, the acceleration is kept within the envelope defined by the linear segments. Also, slope of the segments correlate to the acceleration of the haptic actuator (in particular, acceleration of a moving mass of the haptic actuator) called for by the envelope. For example, if the slope of the segment 615 is steep, then a high acceleration would be required. Such a high acceleration may not be within the capability of the haptic actuator. That is, there may be a limit to acceleration capability of the haptic actuator. Also, even if the haptic actuator itself may be capable of handling high acceleration, the device that has the haptic actuator incorporated therein (e.g., the mobile device) may not be able to supply sufficient power to the haptic actuator. That is, the device may also have limits. Therefore, slopes of segments of the envelope may be adjusted in consideration of the limits (electrical and/or mechanical) of the haptic actuator and the limits (electrical and/or mechanical) of the device.

Referring back to FIG. 5, in block 520, the device (e.g., DSP 210, 310, envelope composer 211) may smooth the envelope so that a first derivative of a moving mass of the haptic actuator is continuous at one or more boundaries of the piece-wise linear segments after the smoothing. That is, the piece-wise linear segment boundaries may be smoothed.

Again, FIG. 6 will be used as way of explanation. Note that the slope of segment 605 is zero and the slope of segment 615 is positive. That is, there is an abrupt change in the slope of the envelope at the boundary of segments 605 and 615, i.e., there is a sharp corner. This implies that the acceleration of the haptic actuator (in particular, the acceleration of a moving mass of the haptic actuator) has to instantaneously change, which is undesirable. Therefore, the envelope may be smoothed to eliminate the sharp corners so that the envelope is continuous—e.g., maintain continuous di/dt at such boundaries. In an aspect, a quadratic smoothing may be applied to the segment boundaries for smoothing.

In block 530, the device (e.g., DSP 210, 310, envelope composer 211) may adjust or otherwise set the envelope so that first and second integrals of the acceleration waveform generated after the envelope has been composed are both balanced about zero. Recall that first integral of acceleration is velocity, and second integral of acceleration is position, also referred to as excursion. If the first and/or the second integrals are not balanced, this implies that there would be dc current and/or voltage output from the device to the haptic actuator, which can be undesirable. By having the first and second integrals balanced about zero, the undesirable dc current/voltage can be minimized or even avoided all together.

In an aspect, to balance the first and second integrals, the envelope may be set so that initial and final conditions of velocity and excursion of the haptic actuator are both zero. Also, the envelope may be set so that a time duration of the acceleration is an integer multiple of a resonant time period (e.g., inverse of resonant frequency) of the haptic actuator.

Referring back to FIG. 4, in block 420, the device may generate an acceleration waveform corresponding to the envelope. As indicated above, the acceleration waveform may be generated at the resonant frequency of the haptic actuator. In an aspect, a DSP (e.g., DSP 210, 310) may be an example of means for performing block 420. In particular, an envelope composer and/or a mixer (e.g., envelope composer 213 and/or mixer 213) may be configured to perform block 420.

Figure 7:
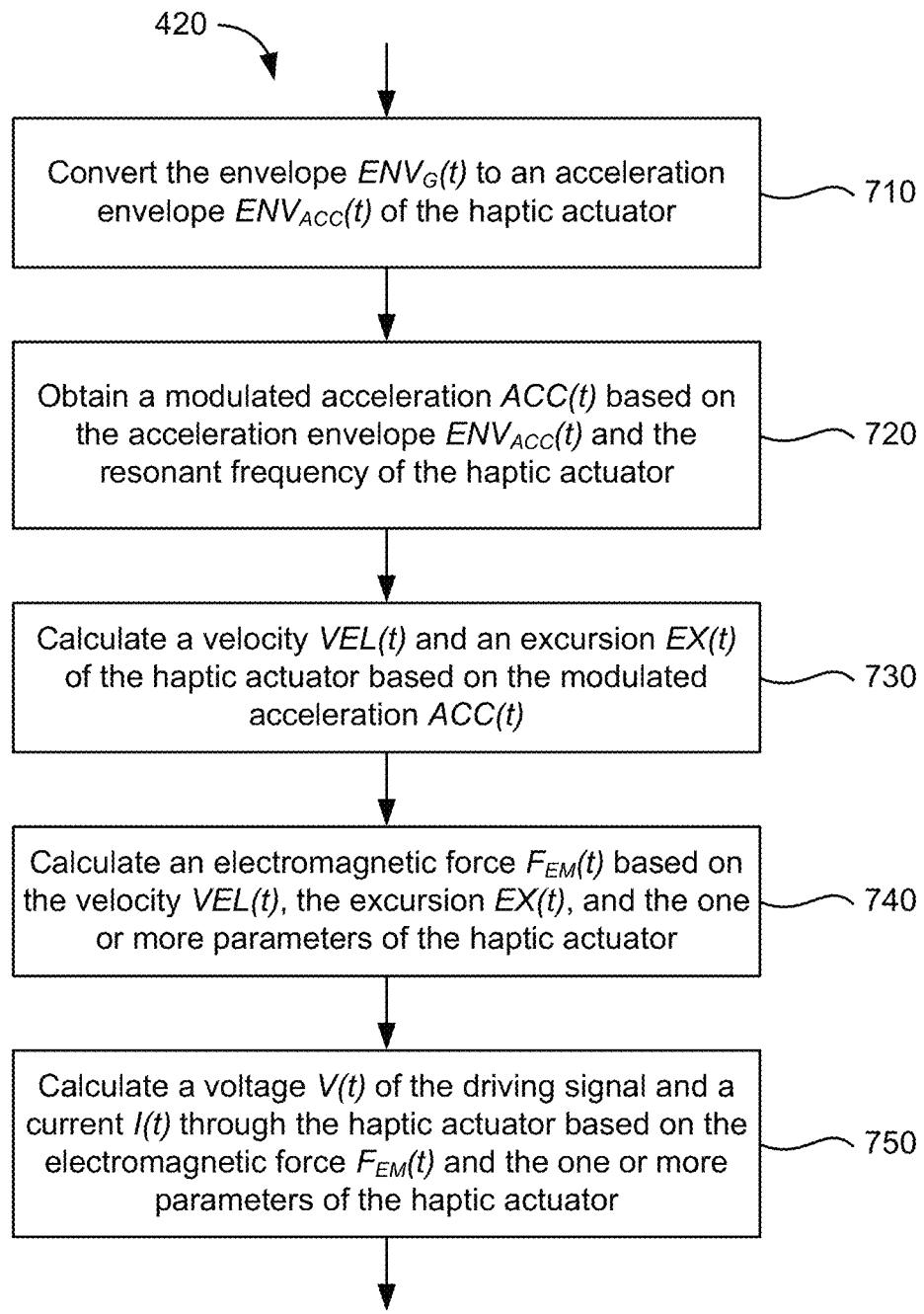

FIG. 7 illustrates a flow chart of an example process that may be performed by the device to implement block 420. In an aspect, the memory 360 may be an example of a non-transitory computer readable medium storing executable instructions for the system and/or device to perform the process of FIG. 7.

In block 710, the device (e.g., DSP 210, 310, envelope composer 211, mixer 213) may convert (710) the composed envelope $ENV_G(t)$ to an acceleration envelope $ENV_{ACC}(t)$ of the haptic actuator. Typically, acceleration of haptics is specified in Gs, where one G is 9.8 m/s$^2$. Note that the composed envelope $ENV_G(t)$ may be viewed as the envelope of the acceleration experienced by the user. Then in an aspect, composed envelope $ENV_G(t)$ may be converted to the acceleration envelope $ENV_{ACC}(t)$ of the moving mass of the haptic actuator.

In an aspect, the following equation may be applied to convert $ENV_G(t)$ to $ENV_{ACC}(t)$ in block 710:

$$ENV_{ACC}(t)=ENV_G(t)*9.8*m_{dev}/m_h \quad (1)$$

In equation (1), $m_{dev}$ may represent the mass of the device (e.g., mobile device incorporating the haptic actuator) and $m_h$ may represent the mass of the haptic actuator. In particular, $m_h$ may represent the mass of the moving part of the haptic actuator.

In block 720, the device (e.g., DSP 210, 310, envelope composer 211, mixer 213) may obtaining a modulated acceleration ACC(t) based on the acceleration envelope $ENV_{ACC}(t)$ and the resonant frequency of the haptic actuator. In an aspect, the following equation may be applied to obtain ACC(t) in block 720:

$$ACC(t)=ENV_{ACC}(t)*\sin(2\pi F_0 t) \quad (2)$$

In equation (2), $F_O$ may represent the resonant frequency of the haptic actuator. The modulated acceleration ACC(t) may be viewed as a result of amplitude modulating a basis function (e.g., sin $(2\pi F_0 t)$) with the acceleration envelope $ENV_{ACC}(t)$.

Recall that the resonant frequency may be provided from the tone generator 217. Also recall that the resonant frequency may be tracked by the tracker 219 through continuous monitoring of feedback measurements provided from the smart haptic driver 230A, 230B, 330. In other words, the resonant frequency may be continuously monitored and updated through the closed-loop feedback.

In block 730, the device (e.g., DSP 210, 310, envelope composer 211, mixer 213) may calculate a velocity VEL(t) and an excursion EX(t) of the haptic actuator based on the modulated acceleration ACC(t). In an aspect, the following equations may be applied to calculate VEL(t) and EX(t) in block 730:

$$VEL(t) = \int_0^t ACC(t)dt \quad (3)$$

$$EX(t) = \int_0^t VEL(t)dt$$

In block 740, the device (e.g., DSP 210, 310, envelope composer 211, mixer 213) may calculate an electromagnetic force $F_{EM}(t)$ to move the moving mass of the haptic actuator based on the modulated acceleration ACC(t), the velocity VEL(t), the excursion EX(t) and on one or more parameters of the haptic actuator. In an aspect, the following equation may be applied to calculate $F_{EM}(t)$ in block 740:

$$F_{EM}(t)=m_h*ACC(t)+b_h*VEL(t)+k_h*EX(t) \quad (5)$$

In equation (5), $m_h$ may represent the mass of the haptic actuator, $b_h$ may represent the dampening factor of the haptic actuator, and $b_h$ may represent the spring stiffness of the haptic actuator. Note these are identified as haptic actuator parameters that may be tracked by the tracker 219 through continuous monitoring of feedback measurements provided from the smart haptic driver 230A, 230B, 330. In other words, the parameters of the haptic actuator may be continuously monitored and updated through the closed-loop feedback.

In block 750, the device (e.g., DSP 210, 310, envelope composer 211, mixer 213) may calculate a voltage V(t) of the driving signal and a current I(t) through the haptic actuator based on the electromagnetic force $F_{EM}(t)$ and the one or more parameters of the haptic actuator. In an aspect, the following equations may be applied to calculate the voltage V(t) and the current I(t) in block 750:

$$I(t)=F_{EM}(t)/BL_h \quad (6)$$

$$V(t) = I(t)*R + L\frac{di}{dt} + BL_h * VEL(t) \quad (7)$$

In equations (6) and (7), R may represent an ohmic drop, L may represent an inductance, and $BL_h$ may represent the electromechanical couple factor of the haptic actuator. Again, these may be tracked by the tracker 219 through continuous monitoring of feedback measurements provided from the smart haptic driver 230A, 230B, 330.

Referring back to FIG. 4, in block 430, the device may drive the haptic actuator with a driving signal in accordance with the acceleration waveform. The driving signal may be an analog drive voltage applied to the haptic actuator by the device (e.g., the mobile device). In an aspect, digital CODEC (e.g., digital CODEC 220, 320) and/or a smart haptic driver (e.g., smart haptic driver 230A, 230B, 330) may be examples of means for performing block 430. In particular, an amplifier (e.g., amplifier 235) may be configured to perform block 430.

In block 440, the device may conduct one or more feedback measurements on the haptic actuator upon the haptic actuator being driven with the driving signal. In an aspect, a smart haptic driver (e.g., smart haptic driver 230A, 230B, 330) may be an example of means for performing block 440. In particular, a feedback sensor (e.g., feedback sensor 237) and/or a zero crossing detector (e.g., zero crossing detector 239) may be configured to perform block 440.

In an aspect, the feedback sensor may measure a voltage across the haptic actuator that occurs due to the haptic actuator being driven. This voltage may be measured while the haptic actuator is driven with the driving signal. That is, the voltage may be measured simultaneously. Alternatively or in addition thereto, the feedback sensor may measure a current flowing through the haptic actuator that occurs due to the haptic actuator being driven. This current may also be measured simultaneously while the haptic actuator is being driven with the driving signal. The measured voltage and/or current may be provided as feedback measurements to the tracker, e.g., through the digital CODEC.

In another aspect, the zero crossing detector may measure the BEMF induced in the haptic actuator due to driving of the haptic actuator with the driving signal and detect the zero crossings. The zero crossing detector may also measure other characteristics of the BEMF such as waveform ringdown, envelope decay, etc. The zero crossing detector may provide the measurements made on the BEMF as feedback measurements to the tracker, e.g., through the digital CODEC.

In block 450, the device may determine one or more parameters of the haptic actuator based on the one or more feedback measurements. The one or more parameters may include the resonant frequency of the haptic actuator. The one or more parameters may include spring stiffness (k), mass (m), mechanical damping factor (b), electromechanical coupling factor (BL), or any combination thereof of the haptic actuator. In an aspect, a DSP (e.g., DSP 310, 310) may be an example of means for performing block 450. In particular, a tracker (e.g., tracker 219) may be configured to perform block 450.

As indicated, the determined parameters of the haptic actuator may be provided to envelope composer 211 and/or to the tone generator 217. In this way, the feedback parameters may enable continuous monitoring of the actual state of the haptic actuator so that consistent haptic experience may be provided to the user.

It should be noted that not all illustrated blocks of FIGS. 4, 5 and 7 need to be performed, i.e., some blocks may be optional. Also, the numerical references to the blocks in FIGS. 4, 5 and 7 should not be taken as requiring that the blocks should be performed in a certain order unless specifically indicated otherwise. Indeed, some blocks may be performed concurrently.

Figure 8:
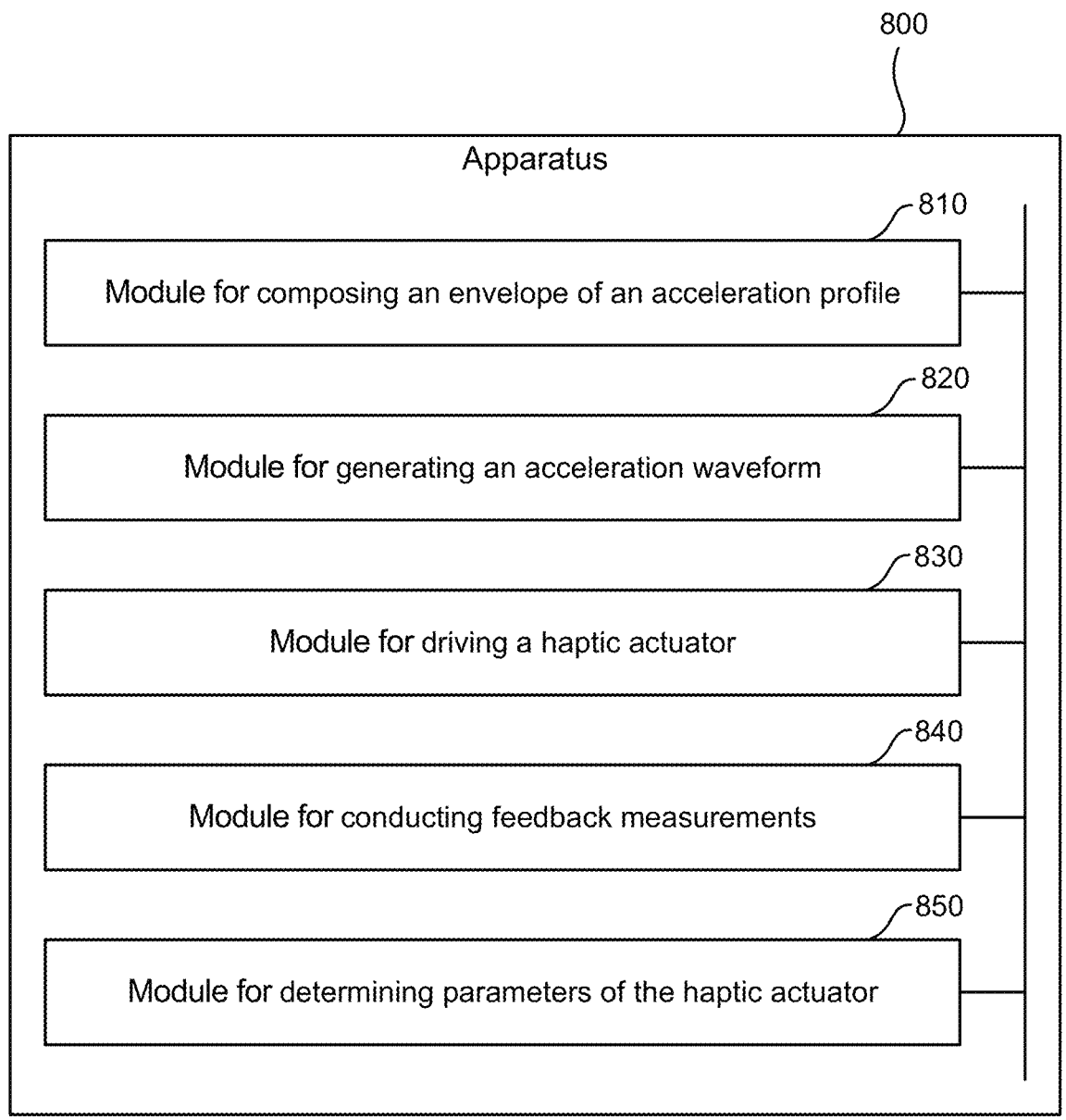
FIG. 8 illustrates a simplified block diagram of several sample aspects of a device configured to generate haptic waveform in accordance with one or more aspects of the disclosure.

FIG. 8 illustrates an example device 800 represented as a series of interrelated functional modules connected by a common bus. Each of the modules may be implemented in hardware or as a combination of hardware and software. For example, the modules may perform the method 400 and processes of FIGS. 4, 5 and 7, and may be implemented as any combination of the modules of the systems/devices 200A, 200B, 300 of FIGS. 2A, 2B, and 3. A module for composing an envelope of an acceleration profile 810 may correspond at least in some aspects to an applications processor (e.g., applications processor 340), a DSP (e.g., DSP 210, 310), and/or a memory (e.g., memory 360). A module for generating an acceleration waveform 820 may correspond at least in some aspects to an applications processor (e.g., applications processor 340), a DSP (e.g., DSP 210, 310), and/or a memory (e.g., memory 360). A module for driving a haptic actuator 830 may correspond at least in some aspects to a digital CODEC (e.g., digital CODEC 220, 320), a smart haptic driver (e.g., smart haptic driver 230A, 230B, 330) and/or a memory (e.g., memory 360). A module for conducting feedback measurements 840 may correspond at least in some aspects to a smart haptic driver (e.g., smart haptic driver 230A, 230B, 330), a digital CODEC (e.g., digital CODEC 220, 320), and/or a memory (e.g., memory 360). A module for determining parameters of the haptic actuator 850 may correspond at least in some aspects to an applications processor (e.g., applications processor 340), a DSP (e.g., DSP 210, 310), and/or a memory (e.g., memory 360).

Figure 9:
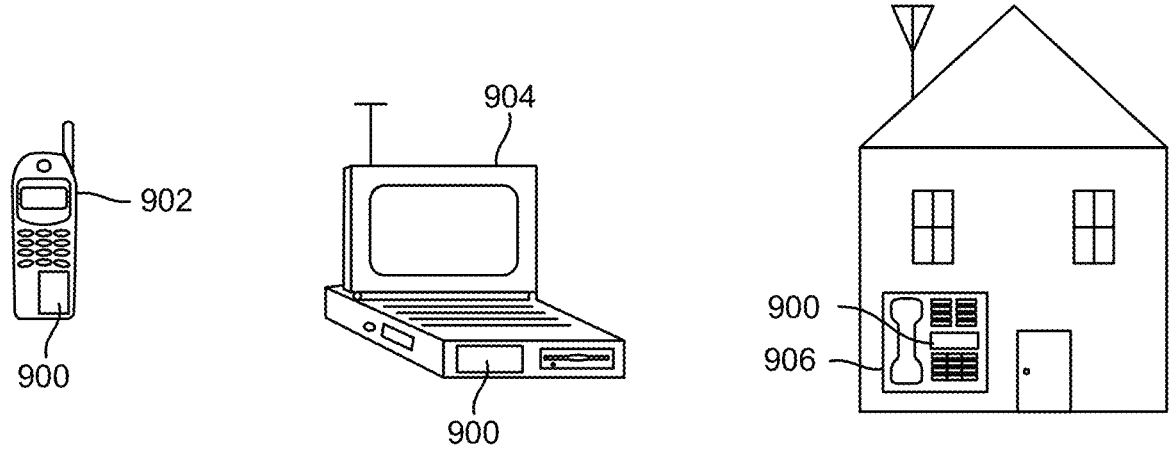
FIG. 9 illustrates various electronic devices which may utilize one or more aspects of the disclosure.

FIG. 9 illustrates various electronic devices that may be integrated with any of the aforementioned systems/devices in accordance with various aspects of the disclosure. For example, a mobile phone device 902, a laptop computer device 904, and a terminal device 906 may include the haptics waveform generation system/device 900. The devices 902, 904, 906 illustrated in FIG. 9 are merely exemplary. Other electronic devices may also include, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), an Internet of things (IoT) device or any other device that stores or retrieves data or computer instructions or any combination thereof.

Implementation examples are described in the following numbered clauses:

Clause 1: A device, comprising: an envelope composer configured to compose, upon an occurrence of a haptic trigger event, an envelope of an acceleration profile based on the haptic trigger event; a mixer configured to generate an acceleration waveform corresponding to the envelope, the acceleration waveform being generated at a resonant frequency of a haptic actuator received from a tone generator; a smart haptic driver configured to: drive the haptic actuator with a driving signal in accordance with the acceleration waveform; and conduct one or more feedback measurements on the haptic actuator upon the haptic actuator being driven with the driving signal; and a tracker configured to determine one or more parameters of the haptic actuator based on the one or more feedback measurements, the one or more parameters including the resonant frequency of the haptic actuator, wherein the mixer is configured to generate the acceleration waveform at the resonant frequency of the haptic actuator as determined based on the one or more feedback measurements.

Clause 2: The device of clause 1, wherein the haptic actuator is a linear resonant actuator.

Clause 3: The device of any of clauses 1-2, wherein in conducting the one or more feedback measurements, the smart haptic driver is configured to: measure a voltage across the haptic actuator due to driving the haptic actuator with the driving signal; measure a current flowing through the haptic actuator due to driving the haptic actuator with the driving signal; or both.

Clause 4: The device of clause 3, wherein the voltage across the haptic actuator is measured simultaneously with driving the haptic actuator with the driving signal, wherein the current flowing through the haptic actuator is measured simultaneously with driving the haptic actuator with the driving signal, or both.

Clause 5: The device of any of clauses 1-4, wherein in conducting the one or more feedback measurements, the smart haptic driver is configured to: measure a back electromotive force (BEMF) induced in the haptic actuator due to driving the haptic actuator with the driving signal.

Clause 6: The device of any of clauses 1-5, wherein the envelope composer is configured to compose the envelope also based on one or more user-experience parameters comprising intensity, duration, sharpness, or any combination thereof.

Clause 7: The device of any of clauses 1-6, wherein the one or more parameters of the haptic actuator determined by the tracker further includes a spring stiffness (k), a mass (m), a mechanical damping factor (b), an electromechanical coupling factor (BL), or any combination thereof, and wherein the envelope composer is configured to compose the envelope also based on the one or more parameters of the haptic actuator.

Clause 8: The device of any of clauses 1-7, wherein in composing the envelope, the envelope composer is configured to scale one or more slopes of the envelope so that the acceleration waveform generated after the envelope has been composed is within electrical limits of the haptic actuator, within mechanical limits of the haptic actuator, within electrical limits of a device incorporating the haptic actuator, within mechanical limits of the device incorporating the haptic actuator, or any combination thereof.

Clause 9: The device of any of clauses 1-8, wherein the envelope is initially represented as piece-wise linear segments, and wherein in composing the envelope, the envelope composer is configured to smooth the envelope so that a first derivative of a moving mass of the haptic actuator is continuous at one or more boundaries of the piece-wise linear segments after the smoothing.

Clause 10: The device of clause 9, wherein a quadratic smoothing is applied at the one or more boundaries of the piece-wise linear segments.

Clause 11: The device of any of clauses 1-10, wherein in composing the envelope, the envelope composer is configured to set the envelope so that first and second integrals of the acceleration waveform generated after the envelope has been composed are both balanced about zero.

Clause 12: The device of clause 11, wherein the envelope is set so that initial and final conditions of a velocity and an excursion of the haptic actuator are both set to zero, and a time duration of the acceleration waveform is an integer multiple of a resonant time period of the haptic actuator.

Clause 13: The device of any of clauses 1-12, wherein the one or more parameters of the haptic actuator determined by the tracker further includes a spring stiffness (k), a mass (m), a mechanical damping factor (b), an electromechanical coupling factor (BL), or any combination thereof, and wherein the mixer is configured to generate the acceleration waveform also based on the one or more parameters of the haptic actuator.

Clause 14: The device of clause 13, wherein in generating the acceleration waveform, the mixer is configured to: convert the envelope $ENV_G(t)$ to an acceleration envelope $ENV_{ACC}(t)$ of the haptic actuator; obtain a modulated acceleration ACC(t) based on the acceleration envelope $ENV_{ACC}(t)$ and the resonant frequency of the haptic actuator; calculate a velocity VEL(t) and an excursion EX(t) of the haptic actuator based on the modulated acceleration ACC(t); calculate an electromagnetic force $F_{EM}(t)$ based on the velocity VEL(t), the excursion EX(t), and the one or more parameters of the haptic actuator; and calculate a voltage V(t) of the driving signal and a current I(t) through the haptic actuator based on the electromagnetic force $F_{EM}(t)$ and the one or more parameters of the haptic actuator.

Clause 15: The device of clause 14, wherein the envelope $ENV_{ACC}(t)$ is converted as $ENV_{ACC}(t)=ENV_G(t)*9.8*m_{dev}/m_h$, $m_h$, $m_{dev}$ representing a mass of a device incorporating the haptic actuator, and $m_h$ representing a mass of the haptic actuator; the modulated acceleration ACC(t) is obtained as $ACC(t)=ENV_{ACC}(t)*\sin(2\pi F_0 t)$, $F_O$ representing the resonant frequency of the haptic actuator; the velocity VEL(t) is calculated as $$VEL(t) = \int_0^t ACC(t)dt;$$

the excursion EX(t) is calculated as $$EX(t) = \int_0^t VEL(t)dt;$$

the electromagnetic force $F_{EM}(t)$ is calculated as $F_{EM}(t)=m_h*ACC(t)+b_h*VEL(t)+k_h*X(t)$, $b_h$ representing a dampening factor of the haptic actuator, and $k_h$ representing the spring stiffness of the haptic actuator; the current I(t) through the haptic actuator is calculated as $$I(t) = \frac{F_{EM}(t)}{BL_h},$$

$BL_h$ representing the electromechanical coupling factor of the haptic actuator; and the voltage V(t) of the driving signal is calculated as $$V(t) = I(t)*R + L\frac{di}{dt} + BL_h * VEL(t),$$

R and L respectively representing resistance and inductance of the haptic actuator.

Clause 16: The device of any of clauses 1-15, wherein the envelope is composed and the acceleration waveform is generated without use of any pre-determined waveform.

Clause 17: A method, comprising: composing, upon an occurrence of a haptic trigger event, an envelope of an acceleration profile based on the haptic trigger event; generating an acceleration waveform corresponding to the envelope, the acceleration waveform being generated at a resonant frequency of a haptic actuator received from a tone generator; driving the haptic actuator with a driving signal in accordance with the acceleration waveform; conducting one or more feedback measurements on the haptic actuator upon the haptic actuator being driven with the driving signal; determining one or more parameters of the haptic actuator based on the one or more feedback measurements, the one or more parameters including the resonant frequency of the haptic actuator, wherein the mixer is configured to generate the acceleration waveform at the resonant frequency of the haptic actuator as determined based on the one or more feedback measurements.

Clause 18: The method of clause 17, wherein the haptic actuator is a linear resonant actuator.

Clause 19: The method of any of clauses 17-18, wherein in conducting the one or more feedback measurements, a voltage across the haptic actuator due to driving the haptic actuator with the driving signal is measured; a current flowing through the haptic actuator due to driving the haptic actuator with the driving signal is measured; or both.

Clause 20: The method of clause 19, wherein the voltage across the haptic actuator is measured simultaneously with driving the haptic actuator with the driving signal, wherein the current flowing through the haptic actuator is measured simultaneously with driving the haptic actuator with the driving signal, or both.

Clause 21: The method of any of clauses 17-20, wherein in conducting the one or more feedback measurements, the smart haptic driver is configured to: a back electromotive force (BEMF) is measured, the BEMF being an EMF induced in the haptic actuator due to driving the haptic actuator with the driving signal.

Clause 22: The method of any of clauses 17-21, wherein the envelope is composed also based on one or more user-experience parameters comprising intensity, duration, sharpness, or any combination thereof.

Clause 23: The method of any of clauses 17-22, wherein the one or more parameters of the haptic actuator determined by the tracker further includes a spring stiffness (k), a mass (m), a mechanical damping factor (b), an electromechanical coupling factor (BL), or any combination thereof, and wherein the envelope is composed also based on the one or more parameters of the haptic actuator.

Clause 24: The method of any of clauses 17-23, wherein composing the envelope comprises: scaling one or more slopes of the envelope so that the acceleration waveform generated after the envelope has been composed is within electrical limits of the haptic actuator, within mechanical limits of the haptic actuator, within electrical limits of a device incorporating the haptic actuator, within mechanical limits of the device incorporating the haptic actuator, or any combination thereof.

Clause 25: The method of any of clauses 17-24, wherein the envelope is initially represented as piece-wise linear segments, and wherein composing the envelope comprises: smoothing the envelope so that a first derivative of a moving mass of the haptic actuator is continuous at one or more boundaries of the piece-wise linear segments after the smoothing.

Clause 26: The method of clause 25, wherein a quadratic smoothing is applied at the one or more boundaries of the piece-wise linear segments.

Clause 27: The method of any of clauses 17-26, wherein composing the envelope comprises: setting the envelope so that first and second integrals of the acceleration waveform generated after the envelope has been composed are both balanced about zero.

Clause 28: The method of clause 27, wherein the envelope is set so that initial and final conditions of a velocity and an excursion of the haptic actuator are both set to zero, and a time duration of the acceleration waveform is an integer multiple of a resonant time period of the haptic actuator.

Clause 29: The method of any of clauses 17-28, wherein the one or more parameters of the haptic actuator determined by the tracker further includes a spring stiffness (k), a mass (m), a mechanical damping factor (b), an electromechanical coupling factor (BL), or any combination thereof, and wherein the acceleration waveform is generated also based on the one or more parameters of the haptic actuator.

Clause 30: The method of clause 29, wherein generating the acceleration waveform comprises: converting the envelope $ENV_G(t)$ to an acceleration envelope $ENV_{ACC}(t)$ of the haptic actuator; obtaining a modulated acceleration $ACC(t)$ based on the acceleration envelope $ENV_{ACC}(t)$ and the resonant frequency of the haptic actuator; calculating a velocity $VEL(t)$ and an excursion $EX(t)$ of the haptic actuator based on the modulated acceleration $ACC(t)$; calculating an electromagnetic force $F_{EM}(t)$ based on the velocity $VEL(t)$, the excursion $EX(t)$, and the one or more parameters of the haptic actuator; and calculating a voltage $V(t)$ of the driving signal and a current $I(t)$ through the haptic actuator based on the electromagnetic force $F_{EM}(t)$ and the one or more parameters of the haptic actuator.

Clause 31: The method of clause 30, wherein the envelope $ENV_{ACC}(t)$ is converted as $ENV_{ACC}(t)=ENV_G(t)*9.8*m_{dev}/m_h$, $m_{dev}$ representing a mass of a device incorporating the haptic actuator, and $m_h$ representing a mass of the haptic actuator; the modulated acceleration $ACC(t)$ is obtained as $ACC(t)=ENV_{ACC}(t)*\sin(2\pi F_0 t)$, $F_O$ representing the resonant frequency of the haptic actuator; the velocity $VEL(t)$ is calculated as $$VEL(t) = \int_0^t ACC(t)dt;$$

the excursion $EX(t)$ is calculated as $$EX(t) = \int_0^t VEL(t)dt;$$

the electromagnetic force $F_{EM}(t)$ is calculated as $F_{EM}(t)=m_h*ACC(t)+b_h*VEL(t)+k_h*X(t)$, $b_h$ representing a dampening factor of the haptic actuator, and $k_h$ representing the spring stiffness of the haptic actuator; the current $I(t)$ through the haptic actuator is calculated as $$I(t) = \frac{F_{EM}(t)}{BL_h},$$

$BL_h$ representing the electromechanical coupling factor of the haptic actuator; and the voltage $V(t)$ of the driving signal is calculated as $$V(t) = I(t)*R + L\frac{di}{dt} + BL_h * VEL(t),$$

R and L respectively representing resistance and inductance of the haptic actuator.

Clause 32: The method of any of clauses 17-31, wherein the envelope is composed and the acceleration waveform is generated without use of any pre-determined waveform.

Clause 33: A device comprising at least one means for performing a method of any of Clauses 17-32.

Clause 34: A device comprising a memory and a processor communicatively connected to the memory, the processor being configured perform a method of any of Clauses 17-32.

Clause 35: A non-transitory computer-readable medium storing code for a device comprising a memory and a processor communicatively connected to the memory, and instructions stored in the memory and executable by the processor to cause the device to perform a method of any of Clauses 17-32.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms include, but are not limited to, a music player, a video player, an entertainment unit, a navigation device, a communications device, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that are able to communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described herein can be configured to perform at least a portion of a method described herein.

It should be noted that the terms "connected," "coupled," or any variant thereof, mean any connection or coupling, either direct or indirect, between elements, and can encompass a presence of an intermediate element between two elements that are "connected" or "coupled" together via the intermediate element unless the connection is expressly disclosed as being directly connected.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Nothing stated or illustrated depicted in this application is intended to dedicate any component, action, feature, benefit, advantage, or equivalent to the public, regardless of whether the component, action, feature, benefit, advantage, or the equivalent is recited in the claims.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or one or more claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions and/or functionalities of the methods disclosed.

Furthermore, in some examples, an individual action can be subdivided into one or more sub-actions or contain one or more sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A device, comprising:
an envelope composer configured to compose, upon an occurrence of a haptic trigger event, an envelope of an acceleration profile based on the haptic trigger event;
a mixer configured to generate an acceleration waveform corresponding to the envelope, the acceleration waveform being generated at a resonant frequency of a haptic actuator received from a tone generator;
a smart haptic driver configured to:
drive the haptic actuator with a driving signal in accordance with the acceleration waveform; and
conduct one or more feedback measurements on the haptic actuator upon the haptic actuator being driven with the driving signal; and
a tracker configured to determine one or more parameters of the haptic actuator based on the one or more feedback measurements, the one or more parameters including the resonant frequency of the haptic actuator,
wherein the mixer is configured to generate the acceleration waveform at the resonant frequency of the haptic actuator as determined based on the one or more feedback measurements.

2. The device of claim 1, wherein the haptic actuator is a linear resonant actuator.

3. The device of claim 1, wherein in conducting the one or more feedback measurements, the smart haptic driver is configured to:
measure a voltage across the haptic actuator due to driving the haptic actuator with the driving signal;
measure a current flowing through the haptic actuator due to driving the haptic actuator with the driving signal; or both.

4. The device of claim 3,
wherein the voltage across the haptic actuator is measured simultaneously with driving the haptic actuator with the driving signal,
wherein the current flowing through the haptic actuator is measured simultaneously with driving the haptic actuator with the driving signal, or both.

5. The device of claim 1, wherein in conducting the one or more feedback measurements, the smart haptic driver is configured to:
measure a back electromotive force (BEMF) induced in the haptic actuator due to driving the haptic actuator with the driving signal.

6. The device of claim 1, wherein the envelope composer is configured to compose the envelope also based on one or more user-experience parameters comprising intensity, duration, sharpness, or any combination thereof.

7. The device of claim 1,
wherein the one or more parameters of the haptic actuator determined by the tracker further includes a spring stiffness (k), a mass (m), a mechanical damping factor (b), an electromechanical coupling factor (BL), or any combination thereof, and
wherein the envelope composer is configured to compose the envelope also based on the one or more parameters of the haptic actuator.

8. The device of claim 1, wherein in composing the envelope, the envelope composer is configured to scale one or more slopes of the envelope so that the acceleration waveform generated after the envelope has been composed is within electrical limits of the haptic actuator, within mechanical limits of the haptic actuator, within electrical limits of a device incorporating the haptic actuator, within mechanical limits of the device incorporating the haptic actuator, or any combination thereof.

9. The device of claim 1,
wherein the envelope is initially represented as piece-wise linear segments, and
wherein in composing the envelope, the envelope composer is configured to smooth the envelope so that a first derivative of a moving mass of the haptic actuator is continuous at one or more boundaries of the piece-wise linear segments after the smoothing.

10. The device of claim 9, wherein a quadratic smoothing is applied at the one or more boundaries of the piece-wise linear segments.

11. The device of claim 1, wherein in composing the envelope, the envelope composer is configured to set the envelope so that first and second integrals of the acceleration waveform generated after the envelope has been composed are both balanced about zero.

12. The device of claim 11, wherein the envelope is set so that
initial and final conditions of a velocity and an excursion of the haptic actuator are both set to zero, and
a time duration of the acceleration waveform is an integer multiple of a resonant time period of the haptic actuator.

13. The device of claim 1,
wherein the one or more parameters of the haptic actuator determined by the tracker further includes a spring stiffness (k), a mass (m), a mechanical damping factor (b), an electromechanical coupling factor (BL), or any combination thereof, and
wherein the mixer is configured to generate the acceleration waveform also based on the one or more parameters of the haptic actuator.

14. The device of claim 13, wherein in generating the acceleration waveform, the mixer is configured to:
convert the envelope $ENV_G(t)$ to an acceleration envelope $ENV_{ACC}(t)$ of the haptic actuator;
obtain a modulated acceleration $ACC(t)$ based on the acceleration envelope $ENV_{ACC}(t)$ and the resonant frequency of the haptic actuator;
calculate a velocity $VEL(t)$ and an excursion $EX(t)$ of the haptic actuator based on the modulated acceleration $ACC(t)$;
calculate an electromagnetic force $F_{EM}(t)$ based on the velocity $VEL(t)$, the excursion $EX(t)$, and the one or more parameters of the haptic actuator; and
calculate a voltage $V(t)$ of the driving signal and a current $I(t)$ through the haptic actuator based on the electromagnetic force $F_{EM}(t)$ and the one or more parameters of the haptic actuator.

15. The device of claim 14, wherein
the envelope $ENV_{ACC}(t)$ is converted as $ENV_{ACC}(t) = ENV_G(t) * 9.8 * m_{dev}/m_h$, $m_{dev}$ representing a mass of a device incorporating the haptic actuator, and $m_h$ representing a mass of the haptic actuator;
the modulated acceleration $ACC(t)$ is obtained as $ACC(t) = ENV_{ACC}(t) * \sin(2\pi F_0 t)$, $F_O$ representing the resonant frequency of the haptic actuator;
the velocity $VEL(t)$ is calculated as $$VEL(t) = \int_0^t ACC(t)dt;$$

the excursion EX(t) is calculated as $$EX(t) = \int_0^t VEL(t)dt;$$

the electromagnetic force $F_{EM}(t)$ is calculated as $F_{EM}(t)=m_h*ACC(t)+b_h\ VEL(t)+k_h*X(t)$, $b_h$ representing a dampening factor of the haptic actuator, and $k_h$ representing the spring stiffness of the haptic actuator;

the current I(t) through the haptic actuator is calculated as $I(t)=F_{EM}(t)/BL_h$, $BL_h$ representing the electromechanical coupling factor of the haptic actuator; and the voltage V(t) of the driving signal is calculated as $$V(t) = I(t)*R + L\frac{di}{dt} + BL_h * VEL(t),$$

R and L respectively representing resistance and inductance of the haptic actuator.

16. The device of claim 1, wherein the envelope is composed and the acceleration waveform is generated without use of any pre-determined waveform.

17. A method, comprising:
composing, upon an occurrence of a haptic trigger event, an envelope of an acceleration profile based on the haptic trigger event;
generating an acceleration waveform corresponding to the envelope, the acceleration waveform being generated at a resonant frequency of a haptic actuator;
driving the haptic actuator with a driving signal in accordance with the acceleration waveform;
conducting one or more feedback measurements on the haptic actuator upon the haptic actuator being driven with the driving signal; and
determining one or more parameters of the haptic actuator based on the one or more feedback measurements, the one or more parameters including the resonant frequency of the haptic actuator,
wherein the acceleration waveform is generated at the resonant frequency of the haptic actuator as determined based on the one or more feedback measurements.

18. The method of claim 17, wherein the haptic actuator is a linear resonant actuator.

19. The method of claim 17, wherein in conducting the one or more feedback measurements,
a voltage across the haptic actuator due to driving the haptic actuator with the driving signal is measured;
a current flowing through the haptic actuator due to driving the haptic actuator with the driving signal is measured; or
both.

20. The method of claim 17, wherein in conducting the one or more feedback measurements, a back electromotive force (BEMF) is measured, the BEMF being an EMF induced in the haptic actuator due to driving the haptic actuator with the driving signal.

21. The method of claim 17, wherein the envelope is composed also based on one or more user-experience parameters comprising intensity, duration, sharpness, or any combination thereof.

22. The method of claim 17,
wherein the one or more parameters of the haptic actuator further includes a spring stiffness (k), a mass (m), a mechanical damping factor (b), an electromechanical coupling factor (BL), or any combination thereof, and
wherein the envelope is composed also based on the one or more parameters of the haptic actuator.

23. The method of claim 17, wherein composing the envelope comprises: scaling one or more slopes of the envelope so that the acceleration waveform generated after the envelope has been composed is within electrical limits of the haptic actuator, within mechanical limits of the haptic actuator, within electrical limits of a device incorporating the haptic actuator, within mechanical limits of the device incorporating the haptic actuator, or any combination thereof.

24. The method of claim 17,
wherein the envelope is initially represented as piece-wise linear segments, and
wherein composing the envelope comprises:
smoothing the envelope so that a first derivative of a moving mass of the haptic actuator is continuous at one or more boundaries of the piece-wise linear segments after the smoothing.

25. The method of claim 17, wherein composing the envelope comprises:
setting the envelope so that first and second integrals of the acceleration waveform generated after the envelope has been composed are both balanced about zero.

26. The method of claim 17,
wherein the one or more parameters of the haptic actuator further includes a spring stiffness (k), a mass (m), a mechanical damping factor (b), an electromechanical coupling factor (BL), or any combination thereof, and
wherein the acceleration waveform is generated also based on the one or more parameters of the haptic actuator.

27. The method of claim 26, wherein generating the acceleration waveform comprises:
converting the envelope $ENV_G(t)$ to an acceleration envelope $ENV_{ACC}(t)$ of the haptic actuator;
obtaining a modulated acceleration ACC(t) based on the acceleration envelope $ENV_{ACC}(t)$ and the resonant frequency of the haptic actuator;
calculating a velocity VEL(t) and an excursion EX(t) of the haptic actuator based on the modulated acceleration ACC(t);
calculating an electromagnetic force $F_{EM}(t)$ based on the velocity VEL(t), the excursion EX(t), and the one or more parameters of the haptic actuator; and
calculating a voltage V(t) of the driving signal and a current I(t) through the haptic actuator based on the electromagnetic force $F_{EM}(t)$ and the one or more parameters of the haptic actuator.

28. The method of claim 27, wherein
the envelope $ENV_{ACC}(t)$ is converted as $ENV_{ACC}(t)=ENVY(t)*9.8*m_{dev}/m_h$, $m_{dev}$ representing a mass of a device incorporating the haptic actuator, and $m_h$ representing a mass of the haptic actuator;
the modulated acceleration ACC(t) is obtained as $ACC(t)=ENV_{ACC}(t)*\sin(2\pi F_0 t)$, $F_O$ representing the resonant frequency of the haptic actuator;
the velocity VEL(t) is calculated as $$VEL(t) = \int_0^t ACC(t)dt;$$

the excursion EX(t) is calculated as $$EX(t) = \int_0^t VEL(t)dt;$$

the electromagnetic force $F_{EM}(t)$ is calculated as $F_{EM}(t) = m_h*ACC(t)+b_h*VEL(t)+k_h*X(t)$, $b_h$ representing a dampening factor of the haptic actuator, and $k_h$ representing the spring stiffness of the haptic actuator;

the current I(t) through the haptic actuator is calculated as $I(t)=F_{EM}(t)/BL_h$, $BL_h$ representing the electromechanical coupling factor of the haptic actuator; and the voltage V(t) of the driving signal is calculated as $$V(t) = I(t)*R + L\frac{di}{dt} + BL_h * VEL(t),$$

R and L respectively representing resistance and inductance of the haptic actuator.

29. A device, comprising:
means for composing, upon an occurrence of a haptic trigger event, an envelope of an acceleration profile based on the haptic trigger event;
means for generating an acceleration waveform corresponding to the envelope, the acceleration waveform being generated at a resonant frequency of a haptic actuator;
means for driving the haptic actuator with a driving signal in accordance with the acceleration waveform;
means for conducting one or more feedback measurements on the haptic actuator upon the haptic actuator being driven with the driving signal; and
means for determining one or more parameters of the haptic actuator based on the one or more feedback measurements, the one or more parameters including the resonant frequency of the haptic actuator,
wherein the means for generating generates the acceleration waveform at the resonant frequency of the haptic actuator as determined based on the one or more feedback measurements.

30. A non-transitory computer-readable medium storing computer-executable instructions for a device, the computer-executable instructions comprising:
one or more instructions instructing the device to compose, upon an occurrence of a haptic trigger event, an envelope of an acceleration profile based on the haptic trigger event;
one or more instructions instructing the device to generate an acceleration waveform corresponding to the envelope, the acceleration waveform being generated at a resonant frequency of a haptic actuator;
one or more instructions instructing the device to drive the haptic actuator with a driving signal in accordance with the acceleration waveform;
one or more instructions instructing the device to conduct one or more feedback measurements on the haptic actuator upon the haptic actuator being driven with the driving signal; and
one or more instructions instructing the device to determine one or more parameters of the haptic actuator based on the one or more feedback measurements, the one or more parameters including the resonant frequency of the haptic actuator,
wherein the acceleration waveform is generated at the resonant frequency of the haptic actuator as determined based on the one or more feedback measurements.

* * * * *